(No Model.)

R. ONDERDONK.
POCKET COAT HOOK.

No. 253,942. Patented Feb. 21, 1882.

Witnesses:
J. T. Acken
Geo. E. Thompson

Inventor:
Robert Onderdonk
By David A. Burr
atty.

UNITED STATES PATENT OFFICE.

ROBERT ONDERDONK, OF NEW YORK, N. Y.

POCKET COAT-HOOK.

SPECIFICATION forming part of Letters Patent No. 253,942, dated February 21, 1882.

Application filed December 31, 1881. (No model.)

*To all whom it may concern:*

Be it known that I, ROBERT ONDERDONK, residing at the city, county, and State of New York, have invented certain new and useful Improvements in Pocket Coat-Hooks; and I do hereby declare that the following is a full, clear, and exact description thereof, reference being had to the accompanying drawings, and to the letters of reference marked thereon, making a part of this specification.

My invention consists in constructing a hook with a slot or recess extending centrally its entire length to receive an auxiliary hook hinged to the first, and adapted to fit within the slot or longitudinal recess in the main hook and to be inclosed and guarded thereby. Two or more inner hooks may thus be combined with a single inclosing outer hook, or a screw-bolt may be pivoted to the shank of the hook and close into its slot as an equivalent for the inner hook, the object of my invention being to furnish in a light, compact, convenient form a hook which, carried in the pocket, may be quickly and readily suspended so as to serve as a support on which to hang a coat or other object.

Figure 1:
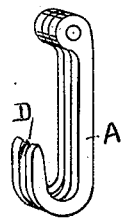
Figure 2:
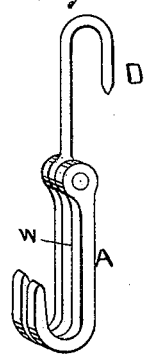
Figure 3:
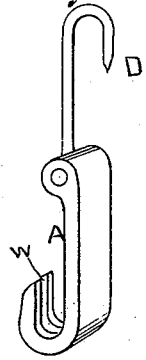
Figure 4:
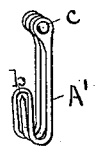
Figure 5:
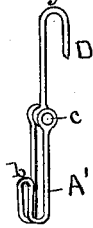
Figure 6:
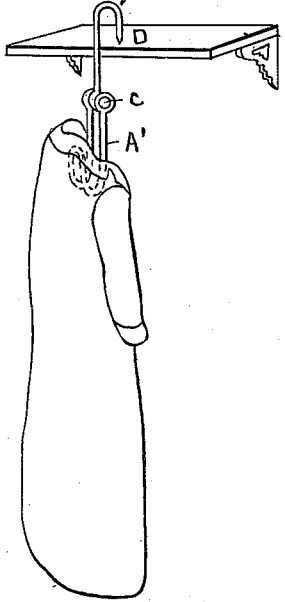
Figure 7:
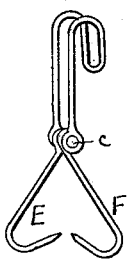
Figure 9:
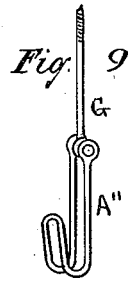
Figure 10:
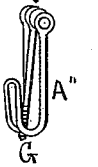

In the accompanying drawings, Figure 1 is a perspective view of my improved pocket-hook closed, ready for the pocket; Fig. 2, a similar view of the hook opened out, ready to engage any suitable projection and to receive the coat or other object to be suspended therefrom, such use thereof being more fully illustrated in Fig. 6. Fig. 3 is a view of the reverse side of the hook. Figs. 4 and 5 illustrate the pocket-hook as made of wire; Fig. 7, the combination of a pair of inner hooks with the main hook, showing the hooks opened out, Fig. 8 illustrating the same when closed for the pocket, and Figs. 9 and 10 the substitution of a screw-bolt for the inner hook as a means of suspending the main hook.

In said drawings, A is the main hook, which may be formed of a metallic casting having a slot or recess, w, therein to receive the secondary hook D, which is pivoted thereto to close therein, as shown in Figs. 1 and 2; or said main hook may be made of a piece of wire, A', Figs. 4 and 5, doubled upon itself at b to form the point of the hook, and which is bent and carried thence, with its two lengths parallel to each other, to form the shank of the hook, and to leave an open interval or slot between them. The ends of the two lengths forming the shank of the hook are bent around a pivot-pin, c. This pivot-pin engages the eye upon the end of the second hook, D, which is made of the same shape as the first, and so bent as that when folded in upon the first it will pass into the open interval thereof, and thus be embraced and guarded thereby, as shown in Fig. 4. When opened out the inner hook presents, in connection with the main hook, the form of a letter S. By causing either hook to engage any suitable projection the remaining hook is supported in proper manner to receive and carry a coat or other object which it is desired to hang up, as shown in Fig. 6.

The inner hook may be connected with the main hook by a ring instead of the pivot-pin c.

Figure 8:
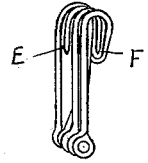

In the modification shown in Figs. 7 and 8 two hooks, E F, are combined with the main hook to close therein, and in such case the inner hooks may be bent in opposite directions. As an equivalent for the inner hook as a means for its support a screw-bolt, F, Fig. 9, may be pivoted to the main hook A'', so as to fold up therein for the pocket, and which for use may be opened out and readily screwed into any proper place, leaving the hook free to receive and support a coat or other object, as required.

The main hook may be made of a metallic plate mortised and properly bent instead of being formed of wire.

What I claim as new, and desire to secure by Letters Patent, is—

The combination, with a main outer slotted hook, of an inner hook or bolt pivoted thereto to close and fold completely therein and be guarded thereby, substantially in the manner and for the purpose herein set forth.

In testimony whereof I have signed my name to this specification in the presence of two subscribing witnesses.

ROBERT ONDERDONK.

Witnesses:
    DANIEL R. GARDEN,
    J. F. ACKER.